United States Patent [19]

Suzuki

[11] Patent Number: 4,843,455

[45] Date of Patent: Jun. 27, 1989

[54] COLOR TELEVISION SIGNAL SAMPLING CLOCK PHASE CONTROL SYSTEM

[75] Inventor: Norio Suzuki, Tokyo, Japan

[73] Assignee: NEC Corporation, Tokyo, Japan

[21] Appl. No.: 234,057

[22] Filed: Aug. 19, 1988

[30] Foreign Application Priority Data

Aug. 20, 1987 [JP] Japan ................. 62-205079
Aug. 20, 1987 [JP] Japan ................. 62-205082
Jul. 19, 1988 [JP] Japan ................. 63-181271

[51] Int. Cl.$^4$ ........................................ H04N 11/04
[52] U.S. Cl. ...................... 358/13; 358/17;
358/19; 370/103; 375/111
[58] Field of Search ............. 358/13, 19, 17;
370/103; 375/111

[56] References Cited

U.S. PATENT DOCUMENTS 4,054,904 10/1977 Saitoh et al. .................... 358/19
4,591,909 5/1986 Kuroda et al. .................. 358/13
4,731,646 3/1988 Kliem ............................. 358/13

FOREIGN PATENT DOCUMENTS 61-30456 7/1986 Japan .

Primary Examiner—John W. Shepperd
Attorney, Agent, or Firm—Sughrue, Mion, Zinn, Macpeak & Seas

[57] ABSTRACT

A sampling clock phase control system includes, at a transmitter side, a circuit for generating a first phase reference signal phase-locked with a color burst of an input color television signal, and a multiplexer for multiplexing the color television signal encoded by a first sampling clock and the first phase reference signal and outputting the multiplexed signal to a channel. The control system includes, at a receiver side, a circuit for generating a second phase reference signal phase-locked with a color burst of a decoded color television signal, a phase comparator for comparing the phases of the first and second phase reference signals, and a circuit which is feedback-controlled by an output signal from the phase comparator and generates a sampling clock for D/A-converting a decoded reception signal.

6 Claims, 5 Drawing Sheets

COLOR TELEVISION SIGNAL SAMPLING CLOCK PHASE CONTROL SYSTEM

BACKGROUND OF THE INVENTION

The present invention relates to a color television signal sampling clock phase control system for regenerating a sampling clock of a receiver side so as to synchronize its phase with that of a sampling clock of a transmitter side.

In a conventional color television transmission system comprising transmitter and receiver sides, and a channel for connecting them, when a color television signal is to be sampled at the transmitter side by using a sampling clock which is independent of a channel clock, a method is employed wherein frequency synchronization is performed such that the number of sampling clocks of the transmitter and receiver sides coincide with each other within a predetermined period. Such a method is disclosed in, e.g., Japanese Patent Application No. 52-117613 entitled "Sampling Frequency Synchronizing Apparatus".

In the above conventional method, however, only frequencies of sampling clocks of the transmitter and receiver sides are synchronized with each other, but phase locking is not performed. For this reason, the phase of the color burst of a color television signal regenerated at the receiver side varies from that of an input color television signal of the transmitter side in accordance with the phase shift of sampling clocks. Therefore, when a color television signal is to be edited by using a coded/transmitted signal, phase locking of the color burst must be performed, and hence a phase locking device such as a frame synchronizer is independently required.

SUMMARY OF THE INVENTION

It is an object of the present invention to eliminate the above-described drawbacks of the conventional technique and provide a sampling clock phase control system capable of forming a sampling clock of a receiver side so as to phase-lock with a sampling clock of a transmitter side without using an independent phase locking device such as a frame synchronizer.

According to the present invention, there is provided a sampling clock phase control system, comprising a transmitter section comprising: means for generating, at least a first color burst phase reference signal of the first color burst phase reference signal phase-locked with color burst of an input color television signal and a first horizontal sync phase reference signal phase-locked with a horizontal sync signal; first sampling means for sampling at least the first color burst phase reference signal every predetermined period obtained by frequency-dividing a channel clock; and a means for multiplexing and transmitting at least the first color burst phase reference signal and encoded data obtained by encoding the color television signal by a first sampling clock; and a receiver section comprising: means for regenerating a color television signal by decoding the encoded data included in the color television signal received by using a second sampling clock; means for generating at least a second color burst phase reference signal of the second color burst phase reference signal phase-locked with the decoded color television signal and a second horizontal phase reference signal phase-locked with the horizontal sync signal; second sampling means for sampling at least the second color burst phase reference signal every period in which at least the first color burst phase reference signal is transmitted; means for obtaining a phase difference signal by adaptively comparing phases of at least the second color burst phase reference signal and at least the first color burst reference signal, smoothing the phase difference signal, and outputting the smoothed signal; and means for generating the second sampling clock while performing feedback control so as to keep a predetermined phase relationship between at least the first color burst phase reference signal and at least the second color burst phase reference signal by changing an oscillation frequency in accordance with a magnitude of the smoothed phase difference signal.

DETAILED DESCRIPTION OF THE PREFERRED EMBODIMENTS

Embodiments of the present invention will be described in detail with reference to the accompanying drawings.

Figure 1:
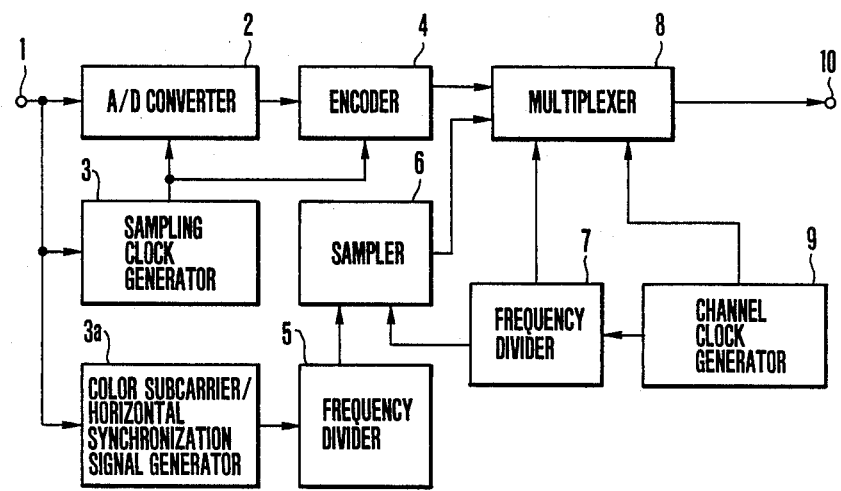
FIGS. 1 and 2 are block diagrams showing an arrangement of an embodiment of the present invention.
Figure 2:
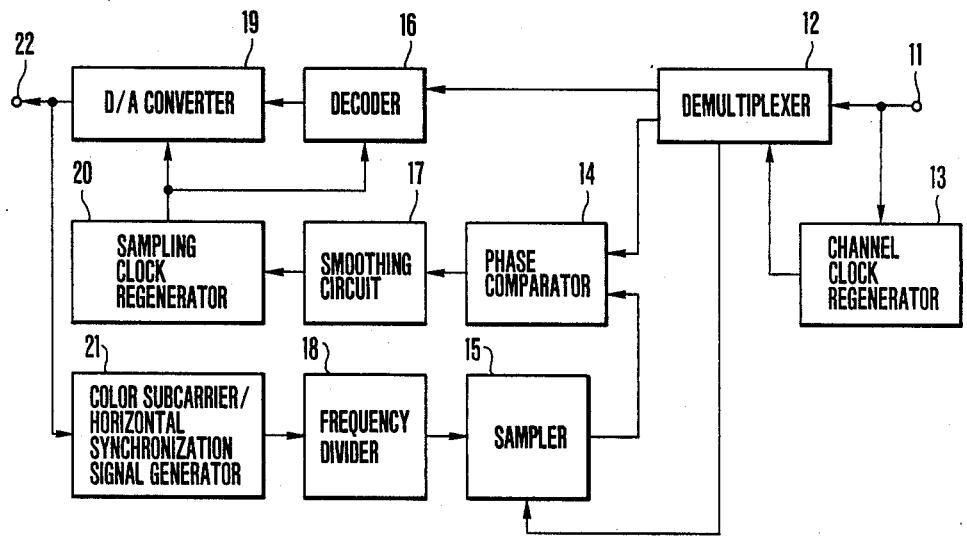

FIGS. 1 and 2 are block diagrams showing an arrangement of transmitter and receiver sections of a sampling clock phase control system according to an embodiment of the present invention.

The transmitter section shown in FIG. 1 comprises an input terminal 1 for receiving an NTSC color television signal, an A/D converter 2, connected to the input terminal 1, for A/D-converting the color television signal, an encoder 4 for encoding an output from the A/D converter 2 into a band-compressed code, a sampling clock generator 3, connected to the input terminal 1, for generating a first sampling clock of the transmitter section on the basis of the frequency of the color subcarrier of the input color television signal and supplying the first sampling clock to the A/D converter 2 and the encoder 4, a color subcarrier/horizontal synchronization signal generator 3a, connected to the input terminal 1, for generating a color subcarrier signal synchronized with the color burst of the input color television signal and extracting a horizontal sync signal, a frequency divider 5 for frequency-dividing the color subcarrier and horizontal sync signals from the color subcarrier/horizontal synchronization signal generator 3a at different frequency-division ratios, a channel clock generator 9 for generating a channel clock, a frequency divider 7 for frequency-dividing the channel clock from the channel clock generator 9, a sampler 6 for receiving output signals from the frequency dividers 5 and 7 and sampling the output signal from the frequency divider 5 by using the output signal from the frequency divider 7, and a multiplexer 8 for multiplexing the outputs from the encoder 4 and the sampler 6 by allocating them to predetermined time slots in a frame by using the respective outputs from the frequency divider 7 and the channel clock generator 9, converting the multiplexed signal into a bipolar signal, and outputting the bipolar signal to a channel through an output terminal 10.

The receiver section shown in FIG. 2 comprises an input terminal 11 for receiving the bipolar signal from the transmitter section, a channel clock regenerator 13, connected to the input terminal 13, for regenerating a channel clock, a demultiplexer 12, connected to the input terminal 11, for demultiplexing the input bipolar signal by using the channel clock output from the channel clock generator 13 and separating the coded data multiplexed in the transmitter section into a color subcarrier and a horizontal sync signal, a decoder 16 for decoding the encoded data output from the demultiplexer 12 by using a second sampling clock of the receiver section, a D/A converter 19 for D/A-converting an output from the decoder 16 by using the second sampling clock and outputting the color television signal to an output terminal 22 of the receiver section, a color subcarrier/horizontal synchronization signal generator 21 for generating a color subcarrier signal phase-locked with the color burst of the output from the D/A converter 19 and extracting a horizontal sync signal, a frequency divider 18 for frequency-dividing the color subcarrier and horizontal sync signals output from the color subcarrier/horizontal synchronization signal generator 21 at the same frequency-division ratios as those of the frequency divider 5 in the transmitter section, a sampler 15 for sampling an output from the divider 18 by using a timing signal supplied from the demultiplexer 12, a phase comparator 14 for comparing the phases of the subcarrier and the horizontal sync signals generated in the receiver section and output from the sampler 15 with those of the subcarrier and horizontal sync signals transmitted from the transmitter section and output from the demultiplexer 12, and outputting a phase comparison signal representing a comparison result, a smoothing circuit 17 for smoothing the phase comparison signal output from the phase comparator 14, and a sampling clock generator 20 for generating the second sampling clock by using the smoothed phase comparison signal.

An operation of the system shown in FIGS. 1 and 2 will be described below.

In the transmitter section shown in FIG. 1, a color television signal input to the input terminal 1 and having a color subcarrier frequency fsc is supplied to the A/D converter 2, sampling clock generator 3, and the color subcarrier/horizontal synchronization signal generator 3a. The sampling clock generator 3 generates a sampling clock synchronized with a frequency fs=3fsc. This sampling clock is supplied to the A/D converter 2, the encoder 4, and other necessary parts, not shown. The color television signal is converted by the A/D converter 2 into a digital signal, and is encoded by the encoder 4 into a band-compressed code. Then, the encoded data is output from the encoder 4 to the multiplexer 8.

The color subcarrier/horizontal synchronization signal generator 3a generates a color subcarrier phase-locked with the color burst of the input color television signal, separates a horizontal sync signal from the input color television signal, and supplies both the signals to the frequency divider 5. The frequency divider 5 quantizes the respective input signals into binary values, and then divides the frequencies of the color subcarrier and horizontal sync signals by 2 and 8, respectively. The frequency-divided signals are then supplied to the sampler 6 as a first color burst phase reference signal and first horizontal sync phase reference signal, respectively.

The channel clock generator 9 generates a 44.736-MHz channel clock and supplies it to the frequency divider 7 and the multiplexer 8. The frequency of the channel clock is 1/4760-divided (corresponding to the period of a DS3 multiframe) by the frequency divider 7, and is supplied to the sampler 6. The sampler 6 samples the first color burst and horizontal sync phase reference signals, which are output from the frequency divider 5, at the start of every frame by using the output signal from the frequency divider 7, and then outputs the two sampled values to the multiplexer 8. The multiplexer 8 allocates the two sampled values output from the sampler 6, the band-compressed encoded data of the color television signal, which is output from the encoder 4, a control signal, a frame sync signal, and the like to predetermined time slots to multiplex them into a DS3 frame, U/B-converts the multiplexed signal, and then outputs it from the output terminal 10 as a 44.736-MHz bipolar signal.

In the receiver section shown in FIG. 2, a 44.736-MHz channel clock is regenerated by the channel clock regenerator 13 by using the bipolar signal input to the input terminal 11, and is supplied to the demultiplexer 12. The demultiplexer 12 B/U-converts the bipolar signal, detects the encoded data, the control signal, the first color burst and horizontal sync phase reference signals, and a pulse signal representing the start position of a frame which are transmitted by demultiplexing the DS3 frame, and then supplies them to the respective parts.

The sampling clock regenerator 20 generates a sampling clock having a frequency corresponding to a control signal from the smoothing circuit 17, and supplies it to the decoder 16 and D/A converter 19. The encoded data output from the demultiplexer 12 is decoded into a color television signal by the decoder 16, converted into an analog signal by the D/A converter 19, and is supplied to the output terminal 22 and the color subcarrier/horizontal synchronization signal generator 21. The color subcarrier/horizontal synchronization signal generator 21 generates a color subcarrier signal having a phase-locked with the color burst of the decoded color television signal and separates a horizontal sync signal, and then supplies them to the frequency divider 18. The frequency divider 18 converts the two input signals into binary signals, and then frequency-divides the color burst and horizontal sync signals by 2 and 8, respectively. The frequency divider 18 supplies the frequency-divided signals to the sampler 15 as second color burst phase reference signal and a second horizontal sync signal phase reference signal.

The sampler 15 samples the second color burst and horizontal sync signal phase reference signals supplied from the frequency divider 18 in response to a signal representing the start of a DS3 frame supplied from the demultiplexer 12, and supplies the sampled signals to the phase comparator 14.

The phase comparator 14 compares each of the phases of the first color burst and horizontal sync phase reference signals supplied from the demultiplexer 12 with a corresponding one of the phases of the second color burst and horizontal sync phase reference signals supplied from the sampler 15 every DS3 frame period.

Each phase comparison is performed by using the exclusive OR of both the binary phase reference signals to obtain a phase comparison signal represented by a binary value 0 or 1. Then, one of the phase comparison signals is adaptively selected and output, and is supplied to the smoothing circuit 17. For example, when the phase difference between the first and second horizontal sync phase reference signals is large, a phase comparison signal representing the phase difference therebetween is output. When the phase difference is small, a phase comparison signal representing the phase difference between the first and second color burst phase reference signals. The smoothing circuit 17 digitally integrates a value of +1 when a phase comparison signal is 1 and a value of −1 when it is 0 every DS3 frame period. After smoothing is satisfactorily performed by integration, the integrated value is D/A-converted, and the smoothed analog phase comparison signal is supplied to the sampling clock regenerator 20.

The sampling clock regenerator 20 supplies the smoothed phase comparison signal to a voltage-controlled oscillator and generates the second sampling clock having a frequency corresponding to a controlled voltage. More specifically, the phase signal of the color burst signal or the horizontal sync signal of the decoded color television signal is fed back to the phase comparator 14 through the D/A converter 19, the color subcarrier/horizontal synchronization generator 21, the frequency divider 18, and the sampler 15 in accordance with a variation in phase of the second sampling clock. Then, the phase of each of the second phase reference signals which are fed back as described above is compared with that of a corresponding one of the first phase reference signals which are supplied from demultiplexer 12 to the phase comparator 14, and a resultant phase comparison signal is supplied to the sampling clock regenerator 20 through the smoothing circuit 17.

The feedback control is performed in the above-described manner so that, at first, a feedback loop is balanced at a point where an average phase difference in the time interval when the first and second horizontal sync phase reference signals are set at "High" or "Low" level becomes 50%, thereby setting the phase difference between the horizontal sync signals of the transmitter and receiver sections, and then the phase comparison control is performed by using the first and second color burst phase reference signals and a feedback loop is balanced at a point where an average phase difference in the interval when the first and second color burst phase reference signals are set at "High" or "Low" level becomes 50%.

A color subcarrier is ½-divided to obtain a color burst phase reference signal, and a horizontal sync signal is ½-divided in synchronism with the rise time of the color subcarrier to obtain a horizontal sync phase reference signal. When a phase difference in the interval when the horizontal sync phase reference signal is set at "High" level is 50%, a phase difference in the interval when the color burst phase reference signal is set at "High" level is substantially 50%. For this reason, even if the phase comparison signals of the horizontal sync signals and the color subcarriers are switched to each other, the balance of a switched feedback loop is maintained.

In other words, since the second sampling clock is regenerated by performing feedback control in such a manner that the difference in phase between the first and second phase reference signals is constant, the phases of the horizontal synchronization and color burst of the regenerated color television signal can be respectively synchronized with that of the color television signal input to the transmitter section. By this manner, doubled merits that the relative phases of the horizontal sync signals can be matched with each other and the phases of color bursts can be correctly synchronized with each other are obtained.

Figure 3:
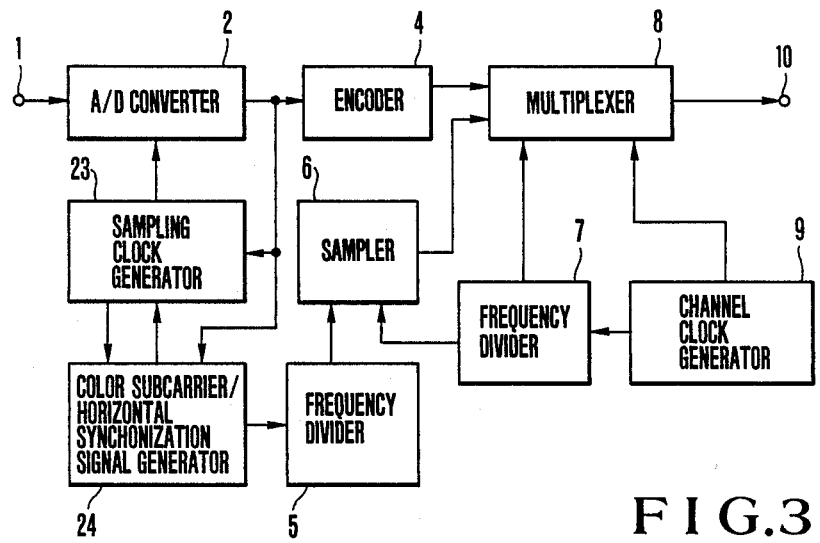
FIGS. 3 and 4 are block diagrams showing an arrangement of another embodiment of the present invention.
Figure 4:
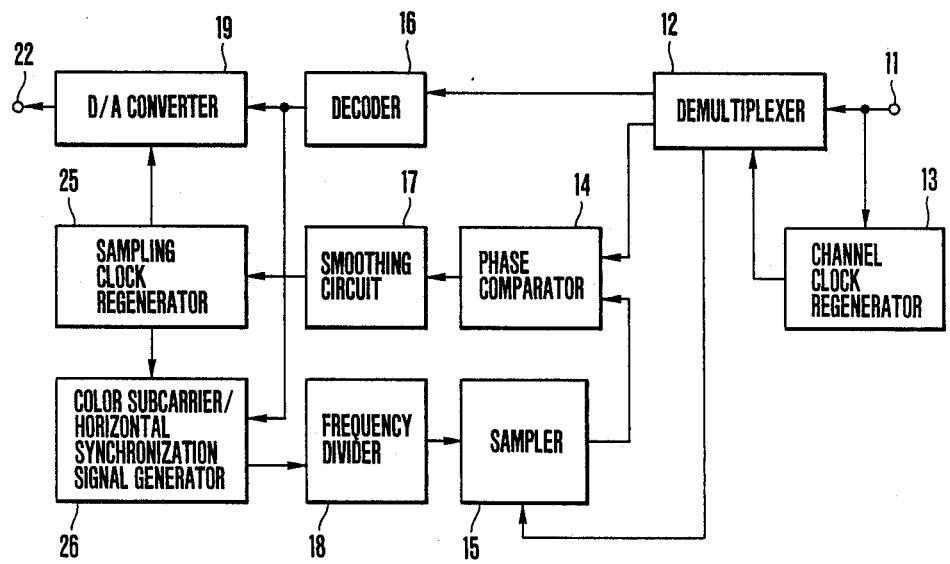

FIGS. 3 and 4 show transmitter and receiver sections according to another embodiment of the present invention.

The same reference numerals in FIGS. 3 and 4 denote the same parts as in FIGS. 1 and 2.

The arrangement of the transmitter section in FIG. 3 is different from that in FIG. 1 in that a sampling clock generator 23 and a color subcarrier/horizontal synchronization signal generator 24 are supplied with the output of the A/D converter 2, and the sampling clock generator 23 and the color subcarrier/horizontal synchronization signal generator 24 supply signals to each other.

The arrangement of the receiver section in FIG. 4 is different from that in FIG. 2 in that a color subcarrier/horizontal synchronization signal generator 26 receives an input signal of the D/A converter 19, and a sampling regenerator 25 supplies a signal to the color subcarrier/horizontal synchronization signal generator 26.

This embodiment is different from that in FIGS. 1 and 2 in a method of generating phase reference signals, particularly in a method of synchronizing a sampling frequency with a horizontal sync frequency.

An operation of a case wherein the sampling frequency is set to be four times the color subcarrier frequency will be described below.

A color television signal converted into a digital signal by the A/D converter 2 is supplied to the color subcarrier/horizontal synchronization signal generator 24 and then a horizontal sync signal is digitally separated. The phase of the digital color television signal at a predetermined sampling point is digitally detected on the basis of this horizontal sync signal, and the difference between the color burst phase and the phase at the sampling point is generated as a control signal. Then, the control signal is supplied to the sampling clock generator 23.

The following method is employed as a method of synchronizing the color burst phase and the phase at the sampling point. The sampled PCM value of the color burst at a certain sampling point is compared with an average level of the color burst, i.e., a blanking level, in the color burst period. A difference as a result of comparison is fed back to the sampling clock generator 23 as a frequency control signal to control the period of the sampling clock. Finally, the phases of the subcarrier and the sampling clock are synchronized with each other by causing the PCM value of the subcarrier at the predetermined sampling point to coincide with the blanking level.

The color burst phase of the color television signal at the sampling point is detected and the phase difference is fed back to the voltage-controlled oscillator in this manner so that sampling is always performed at a given phase, and a sampling clock having a phase-locked with the color burst of the input color television signal can be generated by the sampling clock generator 23.

The color subcarrier/horizontal synchronization signal generator 24 generates a color subcarrier signal and a digitally separated horizontal sync signal by frequency-dividing the sampling frequency in synchronism with the color burst phase. A frequency divider 5 divides the frequencies of the color and horizontal sync signals by 2 and 8, respectively, and generates first color burst and horizontal sync signal phase reference signals.

In the receiver section in FIG. 4, the color subcarrier/horizontal synchronization signal generator 26 generates color burst and horizontal sync signals in synchronism with a digital color television signal decoded by a decoder 16. Then, the generated signals are frequency-divided, and hence second color burst and horizontal sync phase reference signals are obtained. The functions and operations of other parts in the above system are the same as those in the system in FIGS. 1 and 2.

Figure 5:
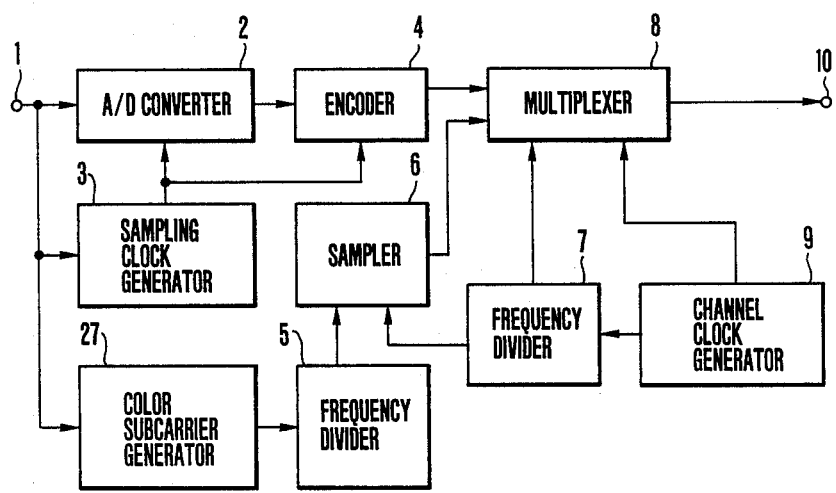
FIGS. 5 and 6 are block diagrams showing an arrangement of still another embodiment of the present invention.
Figure 6:
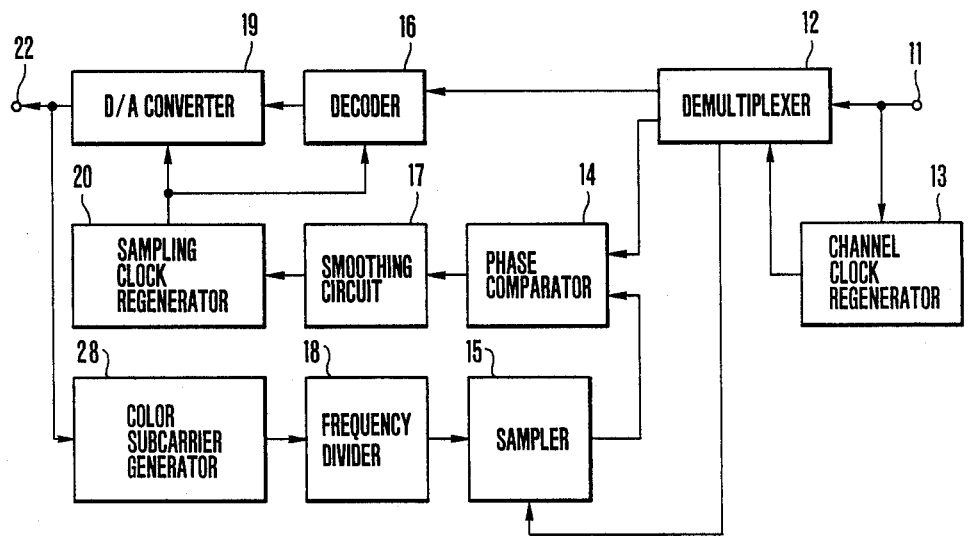

FIGS. 5 and 6 are block diagrams respectively showing arrangements of transmitter and receiver sections of a sampling clock phase control system according to still another embodiment of the present invention.

The same reference numerals in FIGS. 5 and 6 denote the same parts as in FIGS. 1 and 2.

In the embodiment, an NTSC color television signal is A/D-converted at a frequency three times a subcarrier frequency fsc, encoded into a band-compressed code, and is supplied to the receiver section together with color burst phase data at a bit rate of 44.736 Mb/s. In the receiver section, the difference between the color burst phase of the decoded color television signal and that of the color burst supplied from the transmitter section is fed back so as to establish a constant phase relationship therebetween, thus generating a sampling clock.

That is, unlike in the embodiments in FIGS. 1 to 4, in this embodiment, only phase data of color burst of a color television signal is used.

In FIG. 5, the color subcarrier/horizontal synchronization signal generator 3a in FIG. 1 is replaced with a color subcarrier generator 27 for generating a color subcarrier signal synchronized with the color burst of an input color television signal. In FIG. 6, the color subcarrier/horizontal synchronization signal generator 21 is replaced with a color subcarrier generator 28 for generating a color subcarrier signal synchronized with the color burst of the decoded color television signal. Other arrangements in this embodiment are the same as those in the embodiment in FIGS. 1 and 2. Since the operation of this embodiment is the same as that of the system in FIGS. 1 and 2 except for the use of horizontal sync signals, a detailed description thereof will be omitted.

Figure 7:
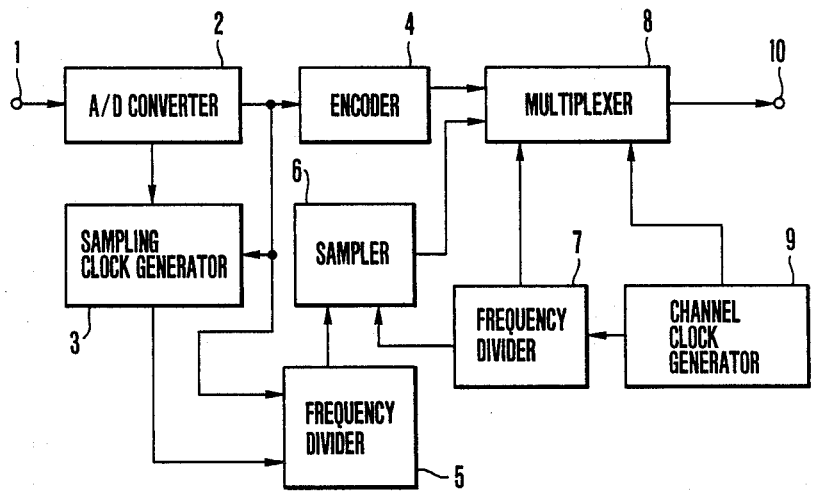
FIGS. 7 and 8 are block diagrams showing an arrangement of still another embodiment of the present invention.
Figure 8:
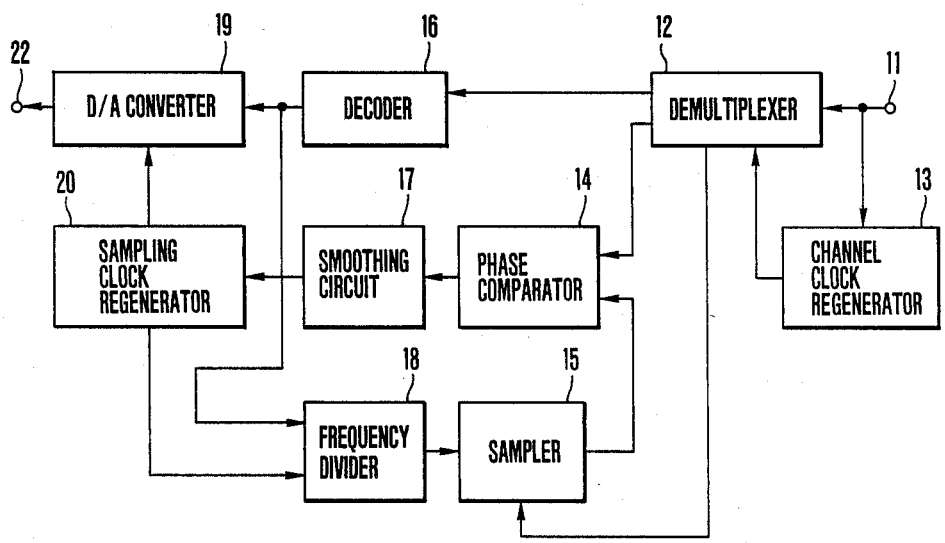

FIGS. 7 and 8 show arrangements of transmitter and receiver section according to still another embodiment of the present invention.

The same reference numerals in FIGS. 7 and 8 denote the same parts as in FIGS. 5 and 6.

In the transmitter section in FIG. 7, a first phase reference signal is generated by frequency-dividing a sampling clock in synchronism with color burst using a frequency divider 5 without using the color subcarrier generator 3a shown in FIG. 5.

Similarly, in the receiver section in FIG. 8, a second phase reference signal can be generated by frequency-dividing a sampling clock, which is regenerated in synchronism with the color burst phase of a digital color television signal decoded by a decoder 16, using a frequency divider 18 without using the color subcarrier generator 28. A sampling clock generator 20 digitally detects the color burst phase of a color television signal, which is converted into a digital signal by an A/D converter 2 in the transmitter section, at a sampling point, and feeds back the phase difference to a voltage-controlled oscillator so that sampling can always be performed at a given phase, thereby generating a sampling clock phase-locked with the color burst of the input television signal.

As described above, according to the above embodiment, in the transmitter section, a phase reference signal synchronized with the color burst of an input color television signal is sampled and transmitted every predetermined sampling interval of channel clocks. In the receiver section, a sampling clock is regenerated while feedback control is performed such that a constant phase relationship is established between the phase of color burst of the decoded color television signal and the transmitted phase reference signal, thereby realizing color burst phase locking. Therefore, a color television signal phase-locked with the color burst of the color television signal in the transmitter section can be decoded in the receiver section.

Figure 9:
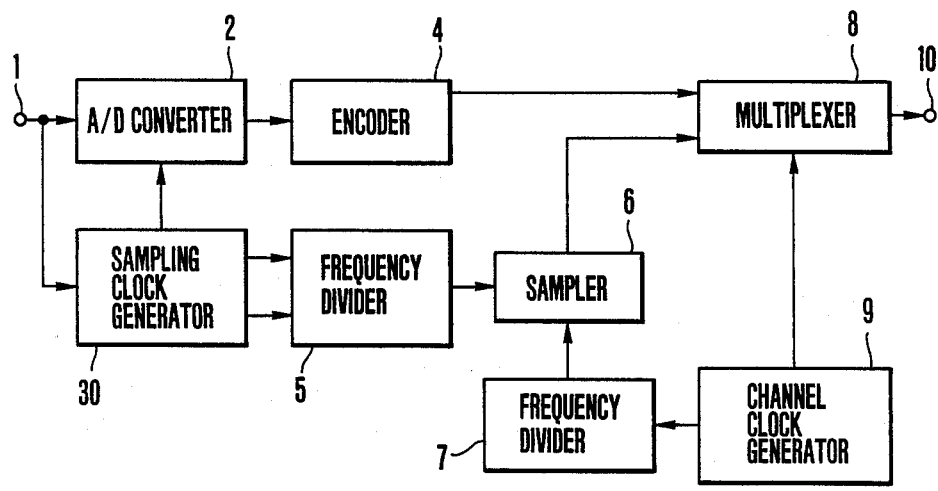
FIGS. 9 and 10 are block diagrams showing an arrangement of still another embodiment of the present invention.
Figure 10:
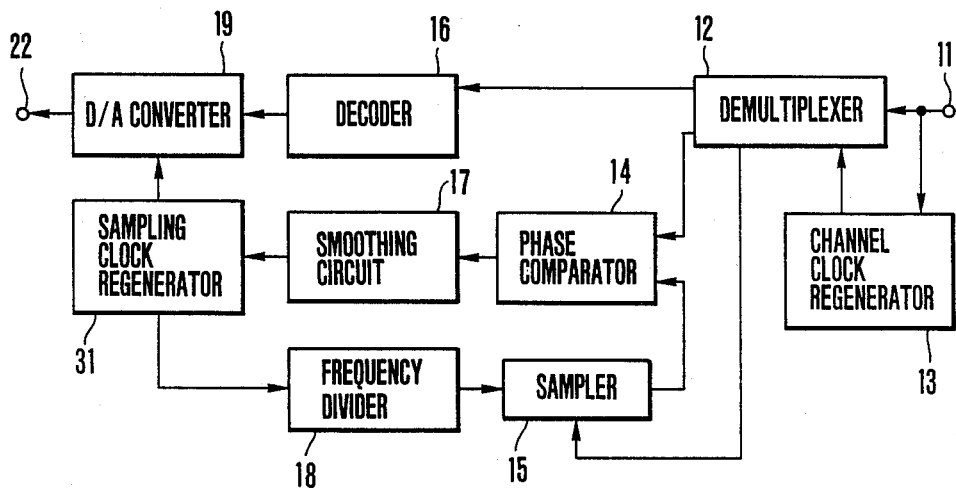

FIGS. 9 and 10 show arrangements of transmitter and receiver sections according to still another embodiment of the present invention.

The reference numerals in FIGS. 9 and 10 denote the same parts as in FIGS. 1 and 2.

In the transmitter section in FIG. 9, an NTSC color television signal having a color burst signal with a frequency fsc, which is input to an input terminal 1, is supplied to an A/D converter 2 and a sampling clock generator 30. The sampling clock generator 3 generates a first sampling clock having a frequency 3fsc and a phase-locked with the color burst signal. A frequency divider 5 divides the frequency of the sampling clock by 6 in synchronism with the phase of a subcarrier, and generates a first phase reference signal corresponding to an integer multiple of the period of the subcarrier. Upon phase locking, the rise time of the phase reference signal and the phase of the color subcarrier are synchronized with each other.

A clock generator 9 generates a 44.736-MHz clock. In a frequency divider 7, the clock is 1/4760-divided (corresponding to the period of a DS3 multiframe), and the first phase reference signal is sampled at the start of every multiframe. Then, the sampled values are multiplexed in predetermined time slots of the DS3 multiframe. In other time slots, a video signal converted into a digital signal by the A/D converter 2 is encoded into a band-compressed code by an encoder 4 and is multiplexed with other control signals and the like. A U/B-converted 44.736-Mb/s bipolar signal is output from an output terminal 10.

The bipolar signal is input to an input terminal 11 of the receiver section. A clock regenerator 13 regenerates a 44.736-MHz channel clock and supplies it to a demultiplexer 12.

Upon B/U conversion of the input signal, the demultiplexer 12 demultiplexes the B/U-converted signal using a DS3 frame and separates the signal into image data, control data, a first phase reference signal, and a pulse signal representing the start position of the DS3 frame, and supplies them to the respective parts.

A second sampling cock regenerated by a sampling clock regenerator 31 is 1/6-divided by a frequency divider 18 in the same manner as in the transmitter section, thereby generating a second phase reference signal. Then, the second phase reference signal is sampled by a sampler 15 every DS3 frame period, and is supplied to phase comparator 14.

The phase comparator 14 compares the phases of the first phase reference signal supplied from the demultiplexer 12 with that of the second phase reference signal. Phase comparison is performed by using the exclusive OR of the respective binary signals, and a comparison signal represented by a binary value of 0 or 1 is output to a smoothing circuit 17. The smoothing circuit 17 digitally performs integrating operations of a value of +1 when the phase comparison signal is 1 and a value of −1 when it is 0 every frame period, thereby performing a smoothing operation. The integrated value is D/A-converted, and then the smoothed phase comparison signal is supplied to the sampling clock regenerator 31. The sampling clock regenerator 31 supplies the smoothed phase comparison signal to a voltage-controlled oscillator, thereby generating a second sampling clock having a frequency corresponding to a controlled voltage. The phase of the second sampling clock is fed back to the phase comparator 14 through the frequency divider 18 and the sampler 15. Finally, a feedback loop is balanced at a point where an average phase difference in the interval when the first and second phase reference signals are set at "High" or "Low" level becomes 50%. Therefore, phase locking of the first and second sampling clocks can be realized.

The image data separated by the demultiplexer 12 is supplied to the decoder 16 and is decoded to regenerate a digital NTSC color television signal. This signal is then D/A-converted into an analog television signal by the D/A converter 19, and is output to the output terminal 22. The A/D converter 2 samples the color burst signal in synchronism with the first sampling clock, while the D/A converter 19 in the receiver section D/A-converts the color burst signal by using the second sampling clock phase-locked with the first sampling clock. Therefore, the color burst signal of the television signals input to the input terminal 1 and output from the output terminal 22 can be phase-locked relative to each other.

As has been described above, according to the above embodiment, the first phase reference signal synchronized with the color subcarrier and the sampling clock is sampled and transmitted at the predetermined sample of channel clocks. At the receiver side, the first sampling clock at the transmitter side and the second sampling clock at the receiver side can be synchronized with each other by comparing the phase of the first phase reference signal with that of the second phase reference signal generated from the regenerated clock. As a result, relative phase locking of the color burst of the input analog color television signal and of the color television signal regenerated at the output terminal at the receiver side can be realized. Therefore, a frame synchronizer or the like for suppressing phase variations is not required.

What is claimed is:

1. A sampling clock phase control system comprising:
a transmitter section, comprising:
means for generating at least a first color burst phase reference signal phase-locked with a color burst of an input color television signal;
first sampling means for sampling at least the first color burst phase reference signal every predetermined period obtained by frequency-dividing a channel clock; and
means for multiplexing and transmitting at least the first color burst phase reference signal and encoded data obtained by encoding the color television signal sampled by a first sampling clock; and
a receiver section comprising:
means for regenerating a color television signal by decoding the encoded data of the color television signal received by using a second sampling clock;
means for generating at least a second color burst phase reference signal phase-locked with a color burst of the decoded color television signal;
second sampling means for sampling at least the second color burst phase reference signal every period in which at least the first color burst phase reference signal is transmitted;
means for obtaining a phase difference signal by adaptively comparing a phase of at least the second color burst reference signal output from said second sampling means with a phase of at least the first color burst phase reference signal, smoothing the phase difference signal, and outputting the smoothed signal; and
means for generating the second sampling clock while performing feedback control so as to keep a predetermined phase relationship between at least the first phase reference signal and at least the second phase reference signal by changing an oscillation frequency in accordance with a magnitude of the smoothed phase difference signal.

2. A sampling clock phase control system comprising:
a transmitter section comprising:
an A/D converter for A/D-converting an input color television signal by using a first sampling clock;
means for generating the first sampling clock;
means for generating a channel clock;
means for generating a first color burst reference signal phase-locked with a first color burst of the input color television signal and a first horizontal sync phase reference signal phase-locked with a horizontal sync of the input color television signal;
means for sampling the first color burst phase reference signal and the first horizontal sync reference signal every predetermined period obtained by frequency-dividing the channel clock; and
means for multiplexing and transmitting encoded data obtained by encoding the input color television signal sampled by the first sampling clock, the first color burst and horizontal sync phase reference signals, and encoded data of the input color television signal sampled by the sampling clock; and
a receiver section comprising:
means for regenerating a color television signal by decoding the encoded data of the color television signal received by using a second sampling clock;
means for generating second color burst and horizontal sync phase reference signals phase-locked with the color burst and the horizontal synchronization signal of the decoded color television signal, respectively;
means for sampling the second color burst and horizontal sync phase reference signals every period when the first color burst and horizontal sync phase reference signals are transmitted;
means for obtaining a phase difference signal by adaptively comparing a phase of each of the second phase reference signals with a phase of a corresponding one of the first phase reference signals, and then smoothing and outputting the phase difference signal; and means for generating the second sampling clock while performing feedback control so as to keep a predetermined phase relationship between the first and second phase reference signals by changing an oscillation frequency in accordance with the smoothed phase difference signal.

3. A system according to claim 2, wherein, in said transmitter section, said means for generating the first color burst and horizontal sync phase reference signals receives the input color television signal and generates the first color burst and horizontal sync phase reference signals, and in the receiver section, said means for generating the second color burst and horizontal sync phase reference signals receives the decoded and D/A-converted color television signal and generates the second color burst and horizontal sync phase reference signals.

4. A system according to claim 2, wherein, in the transmitter section, said means for generating the first color burst and horizontal sync phase reference signals receives the output signal from said A/D-converter and generates the first color burst and horizontal phase reference signals, and, in the receiver section, said means for generating the second color burst and horizontal sync phase reference signals receives the input signal supplied to said D/A converter and generates the second color burst and horizontal sync phase reference signals.

5. A sampling clock phase control system, comprising:

a transmitter comprising:
means for generating a first phase reference signal phase-locked with a color burst of an input color television signal;
means for sampling the first phase reference signal every predetermined period obtained by frequency-dividing a channel clock; and
means for multiplexing and transmitting the first sampled phase reference signal and encoded data of the input color television signal sampled by a first sampling clock; and a receiver section comprising:
means for generating a color television signal by decoding the encoded data of the color television signal by using a second sampling clock;
means for generating a second phase reference signal phase-locked with a color burst of the decoded color television signal;
means for sampling the second phase reference signal every period when the first phase reference signal is transmitted;
means for obtaining a phase difference signal by comparing a phase of the second phase reference signal with a phase of the first phase reference signal, and then smoothing and outputting the phase difference signal; and
means for generating the second sampling clock while performing feedback control so as to keep a predetermined phase relationship between the first and second phase reference signals by changing an oscillation frequency in accordance with the smoothed phase difference signal.

6. A sampling clock phase control system comprising:

a transmitter section comprising:
means for generating a first sampling clock phase-locked with a color subcarrier of an input television signal;
means for generating a first phase reference signal phase-locked with the color subcarrier by frequency-dividing the first sampling clock;
means for sampling the first phase reference signal every predetermined period obtained by frequency-dividing a channel clock; and
means for multiplexing and transmitting the first phase reference signal and encoded data of the input television signal; and a receiver section comprising:
means for generating a second phase reference signal by frequency-dividing a second sampling clock;
means for sampling the second phase reference signal every frame period obtained by frequency-dividing a channel clock regenerated at the receiver side;
means for detecting a phase difference between the first phase reference signal separated from an input signal to the receiver section and the second phase reference signal, and smoothing and outputting the phase difference signal; and
means for generating the second sampling clock phase-locked with the first sampling clock in accordance with the smoothed phase difference signal.

* * * * *